United States Patent Office 3,447,053
Patented May 27, 1969

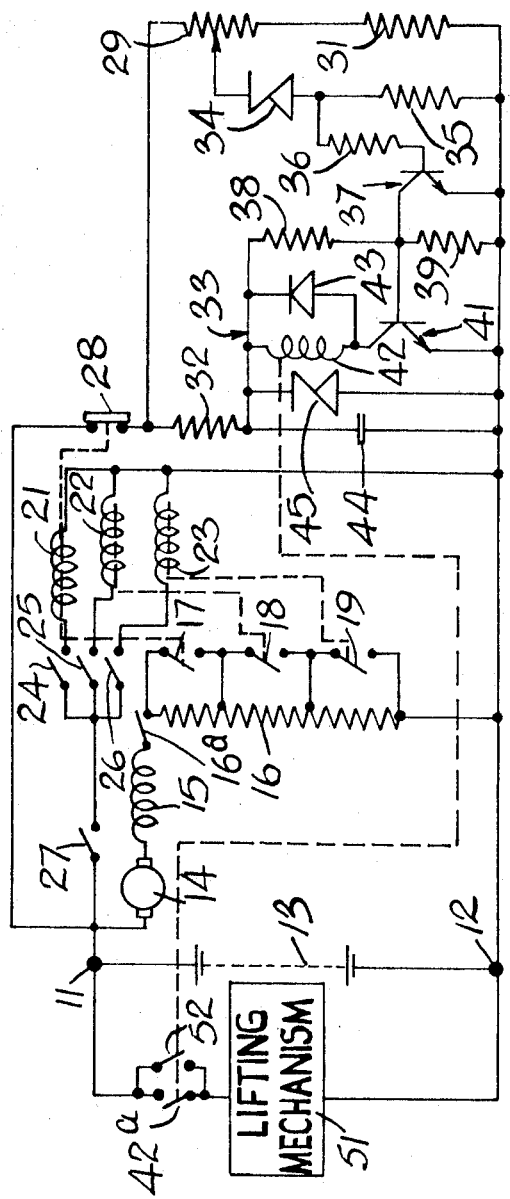

3,447,053
BATTERY DISCHARGE INDICATOR FOR USE IN AN INDUSTRIAL TRUCK
David C. Tedd, Cornwells Heights, Pa., asignor to Eaton Yale & Towne Inc., Cleveland, Ohio, a corporation of Ohio
Filed Jan. 10, 1967, Ser. No. 608,425
Claims priority, application Great Britain, Jan. 14, 1966, 1,825/66
Int. Cl. H02p *3/06*
U.S. Cl. 318—139          7 Claims

ABSTRACT OF THE DISCLOSURE

A circuit that is controlled by battery voltage for indicating a discharged condition of the battery on an industrial truck, and that is disconnected by the traction motor controller so as to avoid giving a false indication when the controller moves to a position that would allow the motor to depress the voltage substantially. The voltage sensing element is a Zener diode, and in the form shown the indication is given through a relay that will incapacitate the lifting mechanism of the truck.

---

This invention relates to a battery discharge indicator for use in an industrial truck.

An indicator according to the invention comprises in combination voltage sensitive means coupled to the battery of the truck for giving an indication when the voltage of the battery falls below a predetermined value, and switch means associated with the traction system of the truck and operable automatically to decouple the voltage-sensitive means from the battery when the truck is operating under conditions in which the current drawn from the battery by the traction system can exceed a predetermined value above which the voltage of the battery is substantially reduced by said current.

It will be appreciated that if a direct measurement of the voltage of the battery is made, a false indication of the battery condition may be given when a high current is being drawn from the battery, due to the fact that current will for the time being lower the voltage of the battery. By decoupling the voltage-sensitive means from the battery when such circumstances are possible, the voltage-sensitive means can be adjusted so that an accurate indication is given.

The accompanying drawing shows a circuit diagram illustrating one example of the invention as applied to a resistance-controlled truck.

Referring to the drawing, there are positive and negative terminals 11, 12 between which the battery 13 of the truck is connected. The armature 14 and field winding 15 of the traction motor of the truck are connected across the terminals 11, 12 in series with a controller having a resistance 16 and a first speed switch 16*a*, the resistance 16 being divided into three parts which are bridged respectively by contacts 17, 18, 19. The contacts 17, 18, 19 are normally open but are closed on energization respectively of coils 21, 22, 23, the connection between each corresponding coil and its contacts being indicated in the drawing by broken lines. The coils 21, 22, 23 are connected in series with switches 24, 25, 26 operable by the driver, and the three parallel circuits thus formed are connected across the terminals 11, 12 in series with a switch 27 operable by the driver. The controller will effect four truck speeds, a first speed in which switch 16*a* is closed while the entire resistance 16 is in the circuit, a second speed which is selected by closing the switch 24, which energizes the coil 21 to close the switch 17 and so short-circuit part of the resistance 16, the third speed in which contacts 17 and 18 are closed, and a fourth speed in which all three contacts 17, 18, 19 are closed, the switch 16*a* having remained closed.

The coil 21 also controls a normally closed contact 28 which when closed completes a connection from the terminal 11 through resistors 29, 31 in series to the terminal 12, and also completes a circuit through the resistor 32 to a supply line 33. A variable point on the resistor 29 is connected to the terminal 12 through a Zener diode 34 and the resistor 35 in series, a point intermediate the diode 34 and resistor 35 being connected through a resistor 36 to the base of a p-n-p transistor 37, the emitter of which is connected to the terminal 12, and the collector of which is connected to the line 33 through a resistor 38, and to the terminal 12 through a resistor 39. A point intermediate the resistors 38, 39 is connected to the base of a p-n-p transistor 41, the emitter of which is connected to the terminal 12, and the collector of which is connected to the line 33 through a relay coil 42 bridged by a diode 43 for conducting back E.M.F. The line 33 is also connected to the terminal 12 through parallel circuits containing respectively a capacitor 44 and a Zener diode 45.

In use, when the truck is traveling at first speed so that the coil 21 is not energized, the contact 28 is closed, and the voltage of the battery 13 is sensed by the Zener diode 34. Provided this voltage is above a predetermined value, the Zener diode 34 conducts, so that the transistor 37 also conducts, and current flowing through the resistor 38 passes through the collector and emitter of the transistor 37, so that the transistor 41 is non-conductive. However, when the voltage drops due to a discharged condition of the battery, the Zener diode 34 ceases to conduct, the transistor 37 switches off, and the transistor 41 is switched on by current flowing through the resistor 38, so energizing the relay coil 42, which gives an indication that the battery is discharged. The Zener diode 45 and capacitor 44 stabilize the voltage supply, and also protect the regulating circuit against transients.

The current drawn from the battery in the first speed condition can vary widely, in a typical case from 80 to 200 amps depending on load. However, the maximum current in the first speed condition is below the current that will substantially depress the battery voltage, and so the indicator works satisfactorily for any current in the first speed condition.

When then truck is moving at any speed other than its first speed, the coil 21 will be energized to open the contact 28, and so the relay coil 42 will not give an indication. It does not of course follow that a false indication would always be given if the contact 28 was open for second and third speed conditions. By way of example, the current at which the battery voltage starts to be substantially depressed might be 200 amps. In second and third speeds, current below 200 amps might be quite common, but the point is that in certain circumstances the maximum current could be exceeded. For this reason, the voltage sensitive circuit is decoupled from the battery when the controller moves beyond first speed position. Of course, it is conceivable that there may be designed a traction circuit that can allow the high current at a different point in the movement of the controller. Therefore, I do not wish to be limited by decoupling of the voltage sensitive circuit merely when the controller moves beyond first speed.

The indication can be given by a warning lamp, or in a variety of other ways. For example, in the particular circuit described, the indication could be given as shown by causing the relay coil 42 to operate a contact 42*a* which stops operation of the lifting mechanism 51 of the truck. In this case, a limit switch 52 in parallel with the contact 42a is preferably provided to permit lowering of a load by the lifting mechanism after the contact 42a opens, the switch 52 opening when the load is in its lowered position.

I believe that the operation of my novel battery discharge indicator will be understood, and that its very considerable value will be appreciated. Those skilled in the art will understand that the concept on which my disclosure is based may readily be utilized as a basis for designing other circuits for carrying out the purposes of my invention. Therefore, it is important that the claims to be granted me shall be of sufficient breadth to prevent the appropriation of my invention by those skilled in the art.

I now claim:

1. In a circuit for indicating a discharged condition of a battery that supplies current for driving a motor, current control means operable for selectively controlling the magnitude of the current applied to said motor whereby to control the motor speed, voltage sensitive means connected to said battery, indicating means normally connected to said battery, means through which said voltage sensitive means control said indicating means for providing an indication when the battery voltage falls below a predetermined level, and means actuated incidental to a current increasing operation of said current control means to disconnect said indicating means from said battery, so that said indicating means need offer no indication should the battery voltage be depressed due to said current increasing operation.

2. The invention as set forth in claim 1, in which said means that are actuated incidental to a current increasing operation comprise switch means acting while disconnecting the indicating means from the battery to disconnect also the voltage sensitive means from the battery.

3. The invention as set forth in claim 1, in which said current control means comprise low speed switch means operable for applying current to said motor, and higher speed means operable to increase the current whereby to actuate said means that disconnect the indicating means.

4. The invention as set forth in claim 1, in which said voltage sensitive means comprise a Zener diode responsive to the battery voltage.

5. In a circuit for indicating a discharged condition of a battery that supplies current for driving a motor, a controller including successive speed portions movable to increase the current to the motor, voltage sensitive means connected to the battery, indicating means connected to said battery and controlled by said voltage sensitive means whereby to give an indication when the battery voltage falls below a predetermined level, switch means for disconnecting said indicating means from the battery, and means through which a speed portion of the controller when moved will operate said switch means, so that said indicating means will not then give an indication.

6. The invention as set forth in claim 5, in which the speed portion of the controller that operates the switch means forms a relatively low speed portion of the controller.

7. The invention as set forth in claim 5, in which the speed portions of the controller comprise a series of relays that are de-energized to permit a low speed of the motor, including one relay that is energized to effect a higher speed, and a further relay that is energized in addition to said one relay to effect a further speed, and through which said one relay when energized effects the operation of the said switch means to disconnect the indicating means.

References Cited

UNITED STATES PATENTS 3,389,325 6/1968 Gilbert ---------- 320—40 XR
3,395,288 7/1968 Von Brimer ---------- 307—10

ORIS L. RADER, *Primary Examiner.*

G. R. SIMMONS, *Assistant Examiner.*

U.S. Cl. X.R.

307—9, 39